United States Patent
Nishihara

(10) Patent No.: US 8,469,651 B2
(45) Date of Patent: Jun. 25, 2013

(54) CONVEYANCE DEVICE USING CARRIAGE

(75) Inventor: Shigeyoshi Nishihara, Osaka (JP)

(73) Assignee: Daifuku Co., Ltd. (JP)

( * ) Notice: Subject to any disclaimer, the term of this patent is extended or adjusted under 35 U.S.C. 154(b) by 629 days.

(21) Appl. No.: 12/596,381

(22) PCT Filed: Aug. 1, 2008

(86) PCT No.: PCT/JP2008/063843
§ 371 (c)(1),
(2), (4) Date: Oct. 16, 2009

(87) PCT Pub. No.: WO2009/028299
PCT Pub. Date: Mar. 5, 2009

(65) Prior Publication Data
US 2010/0129187 A1  May 27, 2010

(30) Foreign Application Priority Data
Aug. 24, 2007  (JP) .................................. 2007-218290

(51) Int. Cl.
*B66B 20/00* (2006.01)
*B61B 13/00* (2006.01)

(52) U.S. Cl.
USPC ........... 414/611; 414/391; 414/592; 414/607; 414/609; 414/785; 254/90; 187/244

(58) Field of Classification Search
USPC ................... 187/244; 254/90; 414/391, 592, 414/607, 609, 611, 785
See application file for complete search history.

(56) References Cited

U.S. PATENT DOCUMENTS

| | | | | |
|---|---|---|---|---|
| 4,031,982 A | * | 6/1977 | Lindfors | 29/281.5 |
| 6,257,371 B1 | * | 7/2001 | Wanner | 187/215 |
| 6,599,080 B1 | * | 7/2003 | Karlsson | 414/663 |
| 7,458,455 B2 | * | 12/2008 | Nakamura et al. | 198/463.3 |

FOREIGN PATENT DOCUMENTS

| | | |
|---|---|---|
| JP | 61075878 U | 5/1986 |
| JP | 7223536 A | 8/1995 |
| JP | 9272430 A | 10/1997 |

(Continued)

OTHER PUBLICATIONS

International Search Report; PCT/JP2008/063843; Sep. 12, 2008; 2 pages.

*Primary Examiner* — Scott Lowe
(74) *Attorney, Agent, or Firm* — St. Onge Steward Johnston & Reens LLC

(57) ABSTRACT

A conveyance device suitable for an automobile final assembly facility has an elevating table for supporting an object to be conveyed in a conveyance carriage which travels along a conveyance path. The elevating table has a table bearing base removably mounted on a table main body for supporting a bottom portion of the object to be conveyed. The table main body has a top surface flush with a flat work floor on the conveyance carriage when the table main body is at a lowering limit position. On the conveyance carriage, a strut bearing base formed of a pair of left and right strut members located on left and right sides of the object to be conveyed, when viewed in plan, and a bearing portion, provided for the strut member, for supporting left and right edges of the object to be conveyed is mounted removably in a state in which the pair of left and right strut members are positioned at both left and right sides of the elevating table.

5 Claims, 11 Drawing Sheets

FOREIGN PATENT DOCUMENTS

| | | |
|---|---|---|
| JP | 2005230960 A | 9/2005 |
| JP | 2006044603 A | 2/2006 |
| JP | 2006111027 A | 4/2006 |
| JP | 2007153178 A | 6/2007 |

* cited by examiner

CONVEYANCE DEVICE USING CARRIAGE

TECHNICAL FIELD

The present invention relates to a conveyance device using a carriage, which can be utilized mainly in an automobile assembly facility.

BACKGROUND ART

In an automobile assembly facility, on a trim line or a final line on which lateral sides (front-and-rear left-and-right lateral surface sides) of a vehicle body are worked from a surrounding area of the vehicle body, a table bearing base for supporting from a lower side of the vehicle body at a low level is used. On a chassis line on which a worker enters from the lower side of the vehicle body to carry out a work on a bottom portion of the vehicle body, a strut bearing base, provided with a pair of left and right strut members, for individually supporting each of both left and right edges of the vehicle body at a high level is used. That is, there is a need for changing support levels of the vehicle body for each work line, and there is also a need for selecting between a support method for supporting the vehicle body from the lower side thereof and that for individually supporting both left and right edges in order to secure excellent workability. Thus, in a conventional general facility of this type, each work line is constituted by conveyance carriers of which the support levels and the support method of the vehicle body differ. Further, as described in Patent Document 1, there is conceived a facility that uses a special conveyance carriage formed so that a vehicle support means capable of changing the support level of the vehicle body to a plurality of stages is provided on the conveyance carriage.
[Patent document 1] Japanese Published Unexamined Patent Application No. 2007-153178

DISCLOSURE OF THE INVENTION

Problem to be Solved by the Invention

In the former, i.e., the conventional general facility in which each work line is constituted by the conveyance carriers of which the support levels and the support method of the vehicle body differ, types of the conveyance carriers increase and a transfer lifter for transferring the vehicle body between the work lines and a conveyance device for the vehicle body between the work lines become necessary, and thus, the facility cost is very expensive. In the latter, i.e., the facility which uses a special conveyance carriage formed so that a vehicle support means capable of changing the support level of the vehicle body to a plurality of stages is provided on a conveyance carriage can solve the problem inherent in the former facility. However, on the chassis line, in order that the vehicle body is supported so that a worker can enter from the lower side of the vehicle body to carry out the work, a strut-shaped stretchable vehicle-body support means must be installed on each of both left and right sides of the vehicle body. Therefore, when the vehicle-body support means is reduced to descend the supported vehicle body to near a floor surface on the conveyance carriage for the work on the trim line or the final line, the vehicle-body support means having a significant size, if being in a reduced state, is exposed on both left and right sides of the vehicle body. As a result, the vehicle-body support means causes interference with the work around the vehicle body, which greatly deteriorates workability.

Means for Solving the Problem

An object of the present invention is to provide a conveyance device using a carriage which can solve the above-described conventional problems. A conveyance device using a carriage according to a first aspect of the invention is, when denoted by reference numerals of embodiments described later, that in which an elevating table 12 for supporting an object to be conveyed (vehicle body B) is provided in a conveyance carriage 1 traveling along a conveyance path, wherein the elevating table 12 is constituted such that a table bearing base 28, 29 for supporting a bottom portion of the object to be conveyed (vehicle body B) is provided removably on a table main body 13a, and such that the table main body 13 has its top surface 13 flush with a flat work floor 2 on the conveyance carriage 1 when the table main body 13 is at a lowering limit position, and on the conveyance carriage 1, a strut bearing base 30 is mounted removably, and the strut bearing base 30 is constituted to be formed of a pair of left and right strut members 37a and 37b mounted removably on the conveyance carriage 1 at both left and right sides of the elevating table 12 when viewed in plan, and a bearing portion 39, provided for the strut members 37a, 37b, for supporting both left and right edges of the object to be conveyed (vehicle body B).

To embody the thus constituted present invention, more specifically, as described in a second aspect, in the conveyance carriage 1, a locking means 44 for locking each strut member 37a, 37b of the strut bearing base 30 in a mounted state is provided, and at a location at which the strut bearing base 30 is mounted and removed in the conveyance path, an operating means 57 for operating an unlocking operation portion 55 provided in the locking means 44 in an unlocking direction can be installed.

When a constitution described in the above-described second aspect is adopted, as described in a third aspect, the locking means 44 can be constituted by: a locking pin 45a provided in a protruding manner vertically facing downward from a base 40 of each strut member 37a, 37b of the strut bearing base 30 in a manner to be extractably inserted into a position-determining hole 46 provided on a conveyance carriage 1 side; and a locking piece 50 that is engaged freely with a locking portion (engaging groove 68) provided in the locking pin 45a and freely swings horizontally while being urged in an engaging direction by an urging means 51; the unlocking operation portion 55 can be constituted by a lever portion 49b that interlocks with the locking pieces 50; and the operating means 57 can be formed of a movable piece 59 provided with a pushing portion 59a for pushing the lever portion 49b of the conveyance carriage 1 halted at a fixed position and an actuator 64 for driving the movable piece 59. Further, as described in a fourth aspect, the locking pin 45a can be provided in a protruding manner in a plurality of pieces from one base 40; within a region surrounded by the plurality of locking pins 45a to 45d, a movable plate 49 that is horizontally rotatable around a vertical support shaft 48 can be provided on a conveyance carriage 1 side; a plurality of the locking pieces 50 corresponding to the respective locking pins 45a to 45d can be provided in a protruding manner from a surrounding area of the movable plate 49; and the urging means 51 and the unlocking operation portion 55 can be provided one each for the movable plate 49.

Effect of the Invention

In the conveyance device using a carriage according to the present invention described in the first aspect, on a line on which a lateral side of the object to be conveyed such as a vehicle body is worked from a surrounding area of the object to be conveyed, a strut bearing base is removed and the object to be conveyed is supported by a table bearing base for supporting a bottom portion of the object to be conveyed mounted on a table main body of the elevating table. Thereby, a required work for the lateral side of the object to be conveyed on a work floor of the conveyance carriage safely and easily in a state in which there is no attachment that may cause interference with the work, for example, such as a strut bearing base, on both left and right sides of the elevating table, i.e., on both left and right sides of the object to be conveyed. In addition, by raising the elevating table while utilizing, for the table bearing base itself, one that is compact and of which the height is low, the object to be conveyed can be supported at a required height, and thus, it becomes possible to carry out the required work for the lateral side of the object to be conveyed safely and easily while implementing a reduction in cost of the table bearing base.

On a line on which a worker enters from the lower side of the object to be conveyed to work on a bottom portion of the object to be conveyed, the table bearing base is removed from the table main body of the elevating table, and the table main body is descended at a lowering limit position so that a top surface of the table main body becomes flush with a work floor of the conveyance carriage, and in place thereof, a pair of left and right strut members of the strut bearing base are mounted at both left and right sides of the elevating table, so that the strut bearing base can be used to keep the object to be conveyed supported at a height that can allow the worker to enter from the lower side of the object to be conveyed. This results in the same state as that in which the strut bearing base is mounted on a conveyance carriage having a flat work floor originally without an elevating table, a table bearing base, and the like, and underneath the supported object to be conveyed, there exists only the flat work floor flush with the work floor of the conveyance carriage, the flat work floor being formed by the top surface of the table main body of the elevating table descended to the lowering limit position. Therefore, it becomes possible to safely and easily carry out a work on the bottom portion of the object to be conveyed by entering from the lower side of the object to be conveyed.

That is, according to the configuration of the present invention, the table bearing base and the strut bearing base are alternatively mounted on one conveyance carriage, and when the table bearing base is mounted, the table main body of the elevating table is raised to a required level, as needed. Thereby, it becomes possible to easily select and obtain an environment favorable for a work on the lateral side of the object to be conveyed and that favorable for a work requiring a worker to enter from the lower side of the object to be conveyed. As compared to a case in which conventional conveyance carriages (conveyance carriers) suited to the respective working environments need to be selected and used, an entire facility cost can be significantly reduced. Moreover, as compared to a case in which a conveyance carriage provided with a special strut bearing base capable of greatly changing a support level of the supported object to be conveyed is used, it becomes possible to secure an excellent working environment all the time where any work can be carried out safely and easily.

According to a configuration described in the second aspect, the strut bearing base transferred onto the conveyance carriage can be locked in a mounted state by the locking means, and thus, it is possible to obtain the same situation as that in which an unstable strut bearing base having a high support level is fixedly installed onto the conveyance carriage, and in this state, safety at the time of conveying the object to be conveyed supported by the strut bearing base can be increased. Further, there is no need for canceling locking manually by a worker at the time of replacing the bearing base, and as compared to a case in which an actuator such as a cylinder unit is mounted on each conveyance carriage side, transmission of an unlocking signal to each conveyance carriage becomes unnecessary. As a result, including this point, it becomes possible to significantly reduce a facility cost. The configuration described in the second aspect can be easily embodied by adopting a configuration described in the third aspect. Further, according to a configuration described in the fourth aspect, a base of one strut member in the strut bearing base can be locked reliably and strongly by a plurality of pieces of locking pins and a plurality of locking pieces, on a conveyance carriage side, which engage with the respective locking pins. In addition, the plurality of locking pieces are provided on one movable plate, and thus, a structure thereof can be embodied simply and at a reasonable cost.

DESCRIPTION OF REFERENCE NUMERALS

Figure 1:
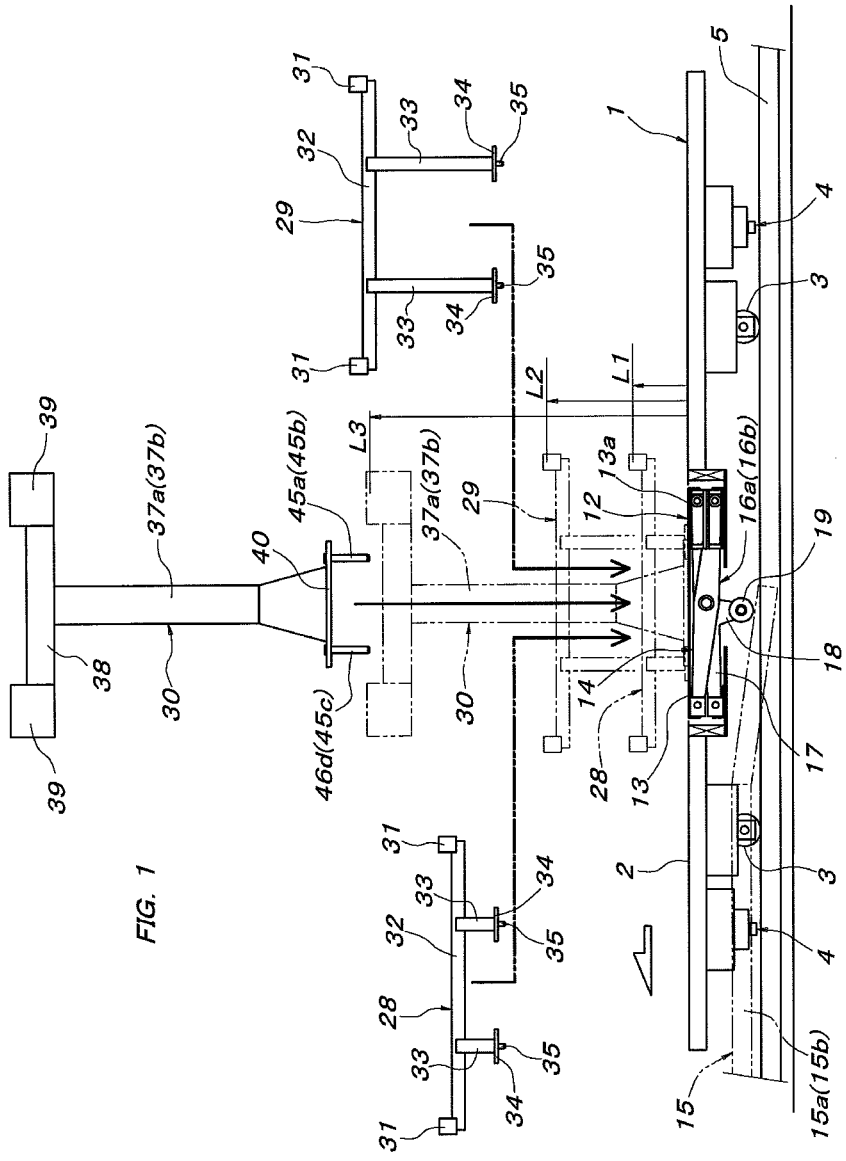
FIG. 1 is a partial longitudinal sectional side view showing a conveyance carriage and bearing bases mounted removably and replaceably thereon.

B: vehicle body (object to be conveyed)
1: conveyance carriage
2: work floor of conveyance carriage
11: friction-driving means
12: elevating table
13: table main body
13a: table surface
14: crosslink mechanism
15, 21: cam
16a, 16b: crosslink 19, 20b: cam follower roller
20: lock lever
28: low supporting table bearing base
29: high supporting table bearing base
30: strut bearing base
31, 39: bearing portion of bearing base
32: frame of bearing base
33: leg portion of bearing base
34, 40: base of bearing base
35: position-determining pin
36, 46: position-determining hole
37a, 37b: strut member of bearing base
38: forward-and-rearward direction girder of bearing base
44: locking means
45a to 45d: position-determining and locking pin
49: movable plate
50: locking piece
51: urging means
55: unlocking operation portion
57: unlocking operation means
66: elevation-guiding roller unit

BEST MODE FOR CARRYING OUT THE INVENTION

A preferred embodiment of the present invention will be described hereinafter with reference to the accompanying drawings. A conveyance carriage 1 is provided with a flat work floor 2 having a rectangular planar shape that is longer in a traveling direction. At a bottom portion of the conveyance carriage 1, two sets of front and rear traveling wheels 3, of which the left and right wheels form a pair, and two sets of front and rear traveling direction-restricting roller units 4 are provided. On a conveyance path of the conveyance carriage 1, a pair of left and right supporting guide rails 5 for horizontally supporting the conveyance carriage 1 via the traveling wheels 3 and a traveling direction-restricting guide rail 6, adjacent to the guide rail 5 on one side, with which the traveling direction-restricting roller unit 4 is engaged, are laid. Furthermore, the traveling direction-restricting roller unit 4 is formed of a pair of left and right vertical axis rollers 4a and 4b sandwiching the traveling direction-restricting guide rail 6 from both left and right sides. Although a drive system of the conveyance carriage 1 is not particularly limited, a conventionally known friction drive system is used in the present embodiment.

That is, rubbed surfaces 7a and 7b parallel to the traveling direction are formed on both left and right sides of the conveyance carriage 1. On a conveyance path side, a friction-driving means 11 constituted by a backup roller 8 that comes in contact with one rubbed surface 7a, a friction drive roller 9 that comes into pressure contact with the other rubbed surface 7b by an urging force, and a motor 10 for rotary driving the friction drive roller 9 is installed.

Figure 3:
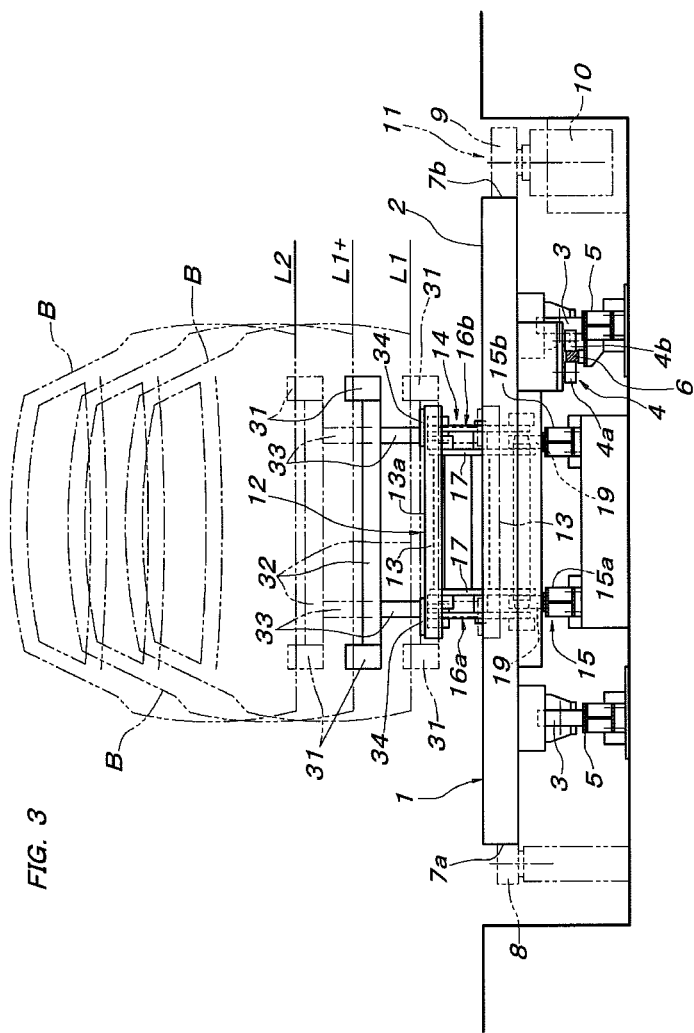
FIG. 3 is a back view showing a state in which the table bearing base is mounted on the conveyance carriage.
Figure 8:
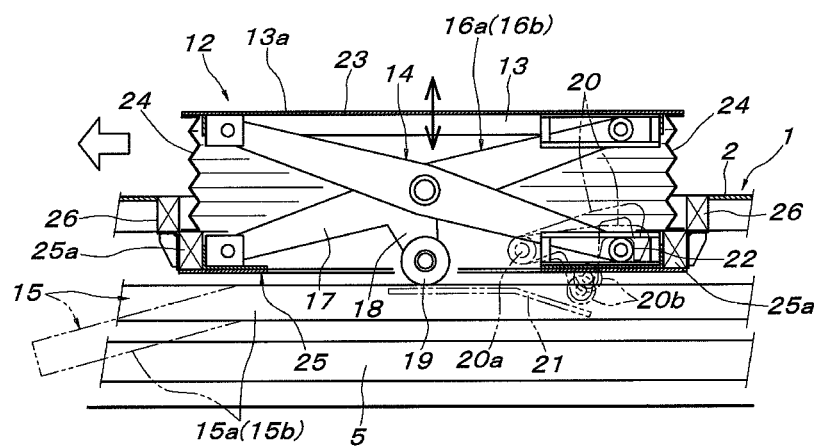
FIG. 8 is a longitudinal sectional side view showing a main portion when a table main body of an elevating table is at a rising limit position.
Figure 9:
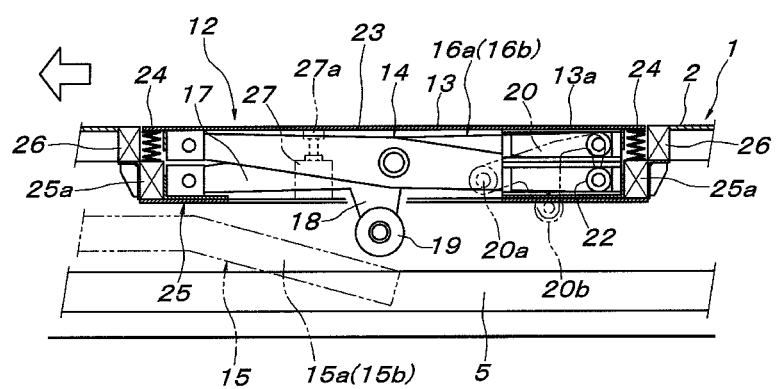
FIG. 9 is a longitudinal sectional side view showing a main portion when the table main body of the elevating table is at a lowering limit position.

An elevating table 12 is provided in the conveyance carriage 1. The elevating table 12 is fitted into a center portion of the flat work floor 2 on the conveyance carriage 1 and is provided with an elevation drive mechanism for elevating/lowering, in parallel while drawing a vertical straight line, a table main body 13 provided with a flat table surface 13a that is rectangular in plan. The elevation drive mechanism uses a crosslink mechanism 14 and a cam 15 laid on the traveling path side, and is a conventionally known one described in Japanese Published Unexamined Patent Application No. 2006-44603 etc. The elevation drive mechanism will now be described briefly. As shown in FIG. 3, FIG. 8, and FIG. 9, a crosslink mechanism 14 for supporting the table main body 13 so as to be elevated and lowered in parallel while drawing a vertical straight line is constituted by a pair of left and right crosslinks 16a and 16b that are interlocked and joined with each other while one end side of each link is axially supported at a fixed position and the other end side thereof is supported slidably in a forward and rearward horizontal direction. A lever portion 18 facing downward is continuously provided, of two links constituting each of the crosslinks 16a and 16b, from a link 17 that has a sliding end on the table main body 13 side, a cam follower roller 19 is axially supported at a lower end of each lever portion 18, and the cam 15 is laid on the traveling path side. When the pair of left and right cam follower rollers 19 are pushed up in conjunction with a travel of the conveyance carriage 1 by a pair of left and right cam rails 15a and 15b constituting the cam 15, the table main body 13 is elevated to a rising limit level of a predetermined height.

Moreover, to hold and maintain the table main body 13 that has been elevated to the rising limit level by the cam 15 for a fixed section at the rising limit level, the cam 15 must simply be continuous throughout the fixed section. In this case, for the purpose of safety measures, or for the purpose of simply providing and laying the cam 15 only at an inlet portion and an outlet portion of the fixed section, it is desirable, as indicated by virtual lines shown in FIG. 8 and FIG. 9, to use both a lock lever 20 for locking both crosslinks 16a and 16b in a posture at the time when the table main body 13 reaches the rising limit level, and an unlocking cam 21 for unlocking the locking by the lock lever 20 immediately before the table main body 13 is lowered from the rising limit level. Specifically, as described in Japanese Published Unexamined Patent Application No. 2006-44603, the lock lever 20 is axially supported on the conveyance carriage 1 side by a horizontal support shaft 20a so as to be automatically engaged with a common sliding shaft 22 situated on the conveyance carriage 1 side of both crosslinks 16a and 16b when the table main body 13 reaches the rising limit level and prevent any retreating movement of the common sliding shaft (descending movement of the table main body 13). At the same time, the lock lever 20 is provided with a cam follower roller 20b at a downwardly facing projection portion. The unlocking cam 21 pushes up the lock lever 20 via the cam follower roller 20b to thereby upwardly remove the lock lever 20 from the common sliding shaft 22 situated on the conveyance carriage 1 side of both crosslinks 16a and 16b so as to allow the retreating movement (descending movement of the table main body 13) of the common sliding shaft 22.

Furthermore, as shown in FIG. 8 and FIG. 9, on a peripheral lower side of a top plate 23 that forms the table surface 13a of the table main body 13, a stretchable square cylindrical cover 24 using bellows to cover, when the table main body 13 is elevated to the rising limit position, a surrounding area of a lower space of the table main body 13, i.e., a space where the crosslink mechanism 14 is installed can be installed. An upper end of the stretchable square cylindrical cover 24 is fixed to a lower side of a rectangular peripheral portion of the top plate 23, and a lower end of the square cylindrical cover 24 can be fixed onto a rectangular frame portion 25a of a frame structure 25 on the conveyance carriage 1 side supporting the crosslink mechanism 14, said rectangular frame portion 25a being positioned underneath the rectangular peripheral portion of the top plate 23. Thus, when the table main body 13 reaches a lowering limit position, the table main body 13 (top plate 23) fits into an inner side of a rectangular frame portion 26 which is provided on the work floor 2 of the conveyance carriage 1 and which forms a rectangular opening portion of a size for the table main body 13 to be perfectly fitted into, and the table surface 13a (top surface of the top plate 23) becomes flush with the work floor 2 of the conveyance carriage 1. This leaves only a gap having a small width (e.g., about 1 cm) that is continuous in a rectangular shape, between the table surface 13a (top surface of the top plate 23) and the surrounding work floor 2 of the conveyance carriage 1. As a result, when the table main body 13 is elevated, the stretched square cylindrical cover 24 covers a space between the surrounding area of the top plate 23 and the rectangular frame portion 26 on the work floor 2 side, thus eliminating any risk of foreign objects etc., falling into the space where the crosslink mechanism 14 is internally installed.

In an elevation drive mechanism of this kind for operating the crosslink mechanism 14 by the cam 15 to elevate the table main body 13, with a load weight of the elevating table 12, in this embodiment, a weight of a vehicle body B supported by the table main body 13, being large with respect to an entire weight of the conveyance carriage 1, it is possible, in an attempt to push up the table main body 13 by the cam 15, that the entire conveyance carriage 1 including the elevating table 12 could be lifted up from the traveling path instead of the table main body 13 (vehicle body) being elevated up with respect to the conveyance carriage 1. Thus, it is desirable to use, in combination, a lifting prevention means to prevent the conveyance carriage 1 from being lifted. For the lifting prevention means, for example, a simply constituted means can be used, for which a roller that is axially supported on the conveyance carriage 1 side or a cam rail that runs over the traveling wheels 3 is installed on the conveyance path side.

The table main body 13 of the elevating table 12 descends to the lowering limit level due to gravity on the traveling path where the cam rails 15a and 15b for pushing up the cam follower roller 19 are not laid. At this time, as indicated by virtual lines in FIG. 9, the table main body 13 (top plate 23) can be supported at a plurality of locations of a peripheral portion thereof by a support member 27 supported by the frame structure 25 on the conveyance carriage 1 side. On the support member 27, a height adjustable supporting bolt 27a can have been provided.

Figure 7:
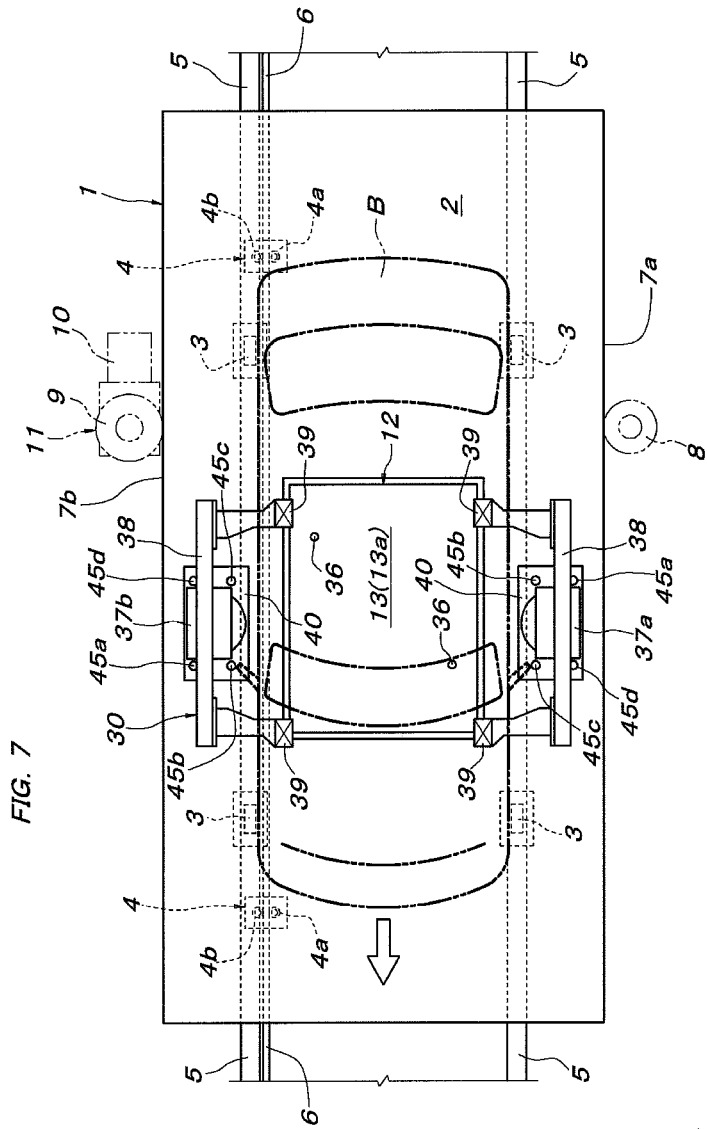
FIG. 7 is a plan view showing a state in which the strut bearing base is mounted on the conveyance carriage.

The above-described conveyance carriage 1 is combined with a low supporting table bearing base 28, a high supporting table bearing base 29, and a strut bearing base 30 shown in FIG. 1. As shown in FIGS. 1 to 4, the low supporting table bearing base 28 and the high supporting table bearing base 29 are those which are installed with bearing portions 31 for supporting two, front and rear locations of both left and right edges of the vehicle body B on a frame 32, and additionally provided with bases 34 to be placed on the table main body 13 of the elevating table 12 at a lower end of each leg portion 33 provided in a protruding manner at four, front and rear as well as left and right locations on the lower side of the frame 32. Among the front and rear as well as left and right bases 34, two bases 34 positioned in a diagonal direction are provided with position-determining pins 35 in a protruding manner facing downward. The table main body 13 (top plate 23) of the elevating table 12 is provided with position-determining holes 36 into which two position-determining pins 35 are each to be extractably inserted, as shown in FIG. 7. The low supporting table bearing base 28 and the high supporting table bearing base 29 are different only in an aspect in which the leg portion 33 of the high supporting table bearing base 29 is higher (longer) than the leg portion 33 of the low supporting table bearing base 28, but the two structures are entirely the same. Therefore, the low supporting table bearing base 28 and the high supporting table bearing base 29 can both be placed on the table main body 13 of the elevating table 12 using the bases 34, and then, by inserting the position-determining pin 35 into the position-determining hole 36, a position (posture) of each of the bearing bases 28 and 29 on the table main body 13 can be maintained in a constant manner.

Figure 5:
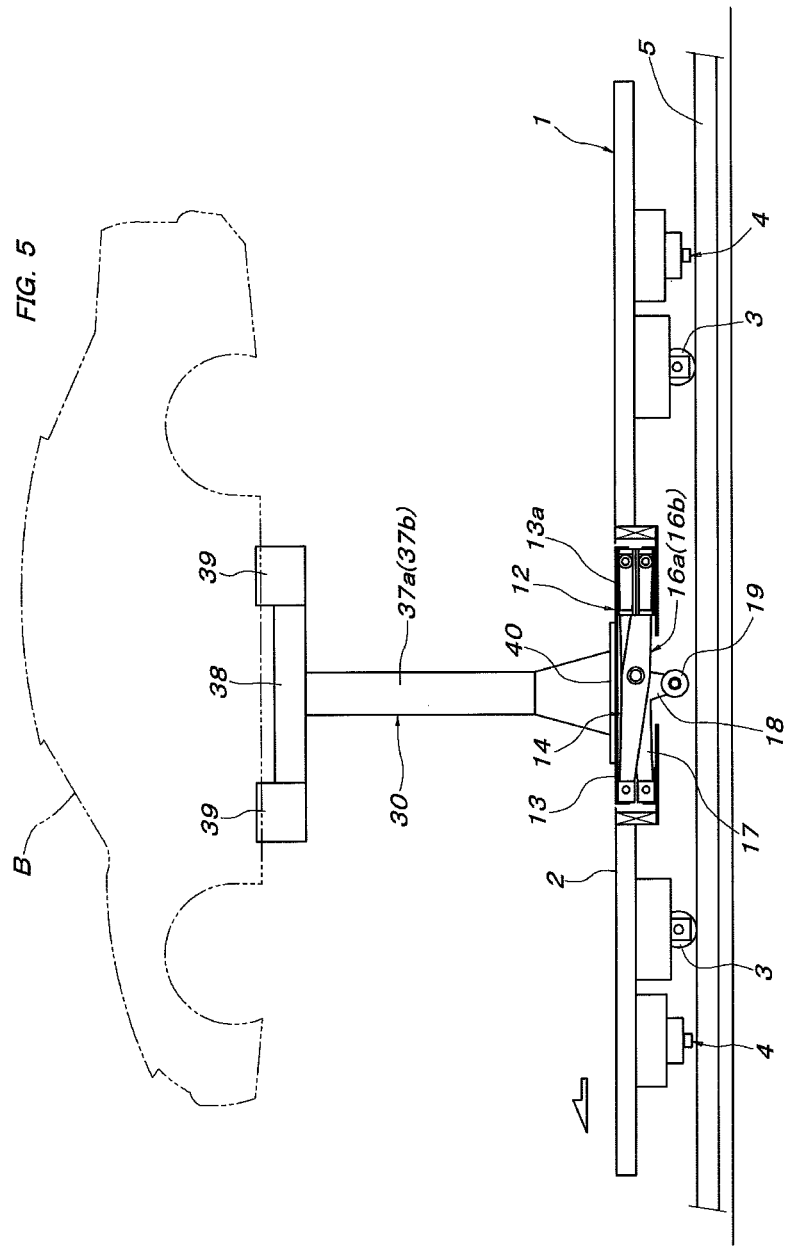
FIG. 5 is a partial longitudinal sectional side view showing a state in which a strut bearing base is mounted on the conveyance carriage.
Figure 6:
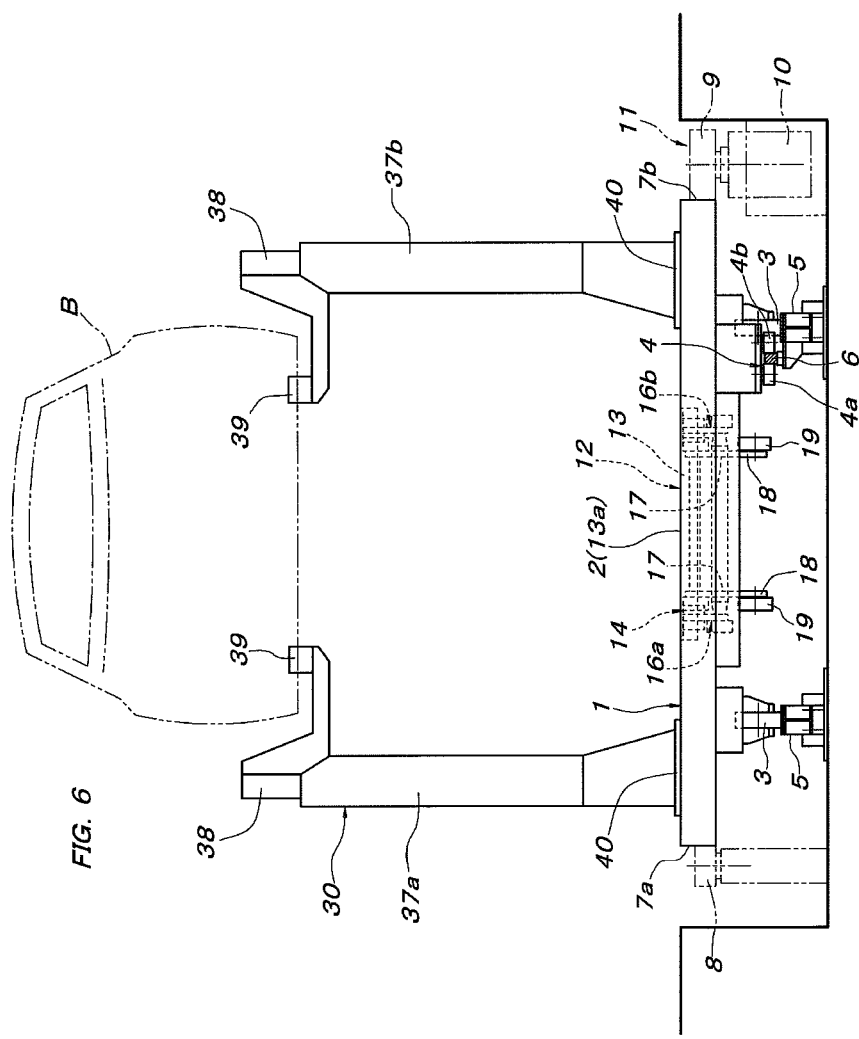
FIG. 6 is a back view showing a state in which the strut bearing base is mounted on the conveyance carriage.

The strut bearing base 30 is that in which, as shown in FIG. 1 and FIG. 5 to FIG. 7, a forward-and-rearward direction girder 38 is additionally provided at an upper end of a pair of left and right strut members 37a and 37b in a shape of a letter T when viewed from the side; and bearing portions 39 for supporting two, front and rear, locations of each of both left and right edges of the vehicle body B are continuously provided, so as to be extended toward an inner side in a cantilever manner from both front and rear end portions of the forward-and-rearward direction girders 38, and is constituted so that bases 40 at a lower end of the pair of left and right strut members 37a and 37b are placed at both left and right sides of the elevating table 12 on the work floor 2 of the conveyance carriage 1. When both left and right edges of the vehicle body B are supported at each bearing portion 39 of the strut bearing base 30 being in this state as shown in FIG. 6 and FIG. 7, the pair of left and right strut members 37a and 37b are positioned outside the vehicle body B when viewed in plan, and with this constitution, the supported vehicle body B is to be supported so as to maintain a height that allows a worker to enter and stand underneath.

Figure 4:
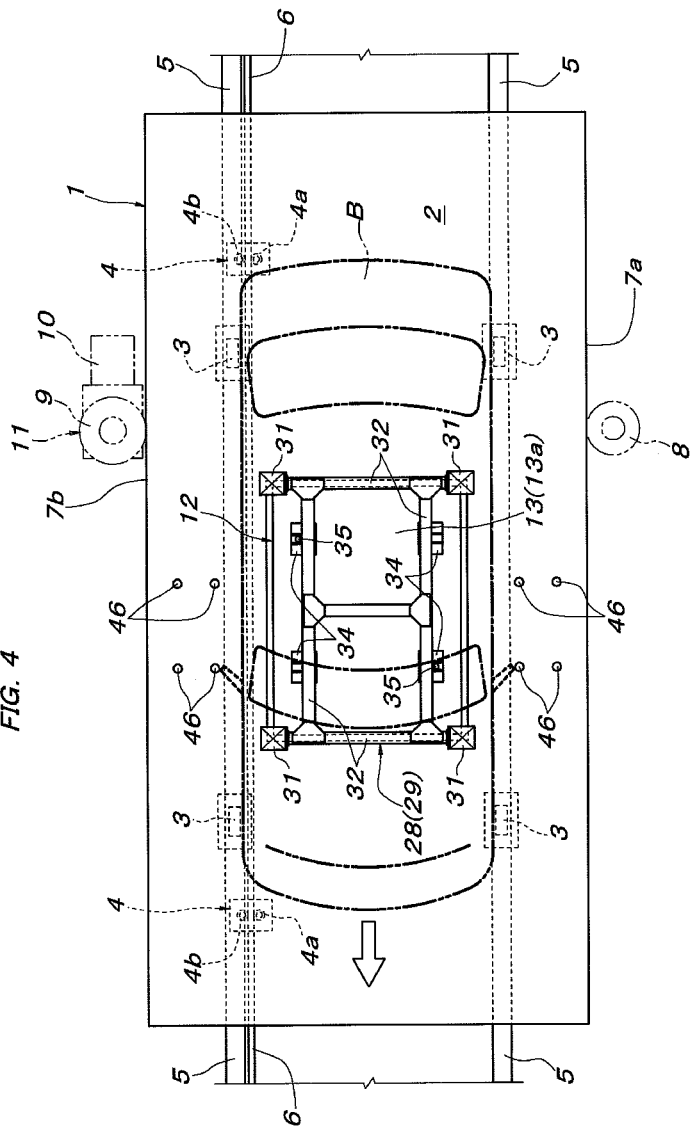
FIG. 4 is a plan view showing a state in which the table bearing base is mounted on the conveyance carriage.
Figure 10:
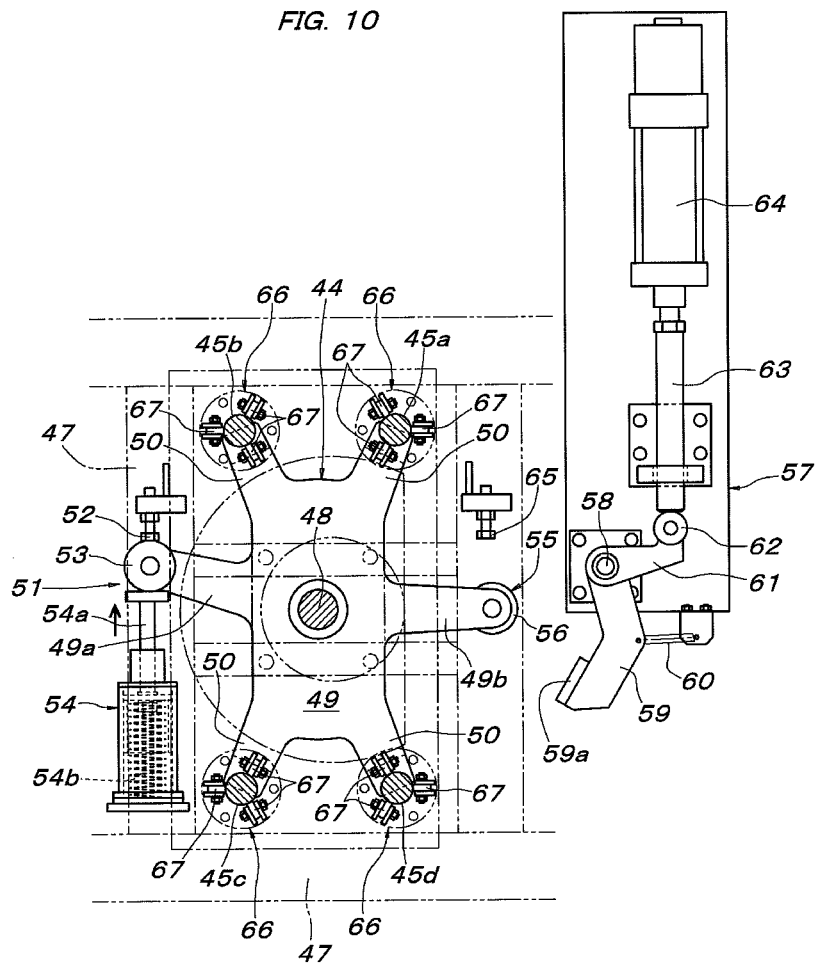
FIG. 10 is a partial cross sectional plan view showing a locked state of a locking means used in combination with a strut bearing base and an unlocking operation means thereof.
Figure 11:
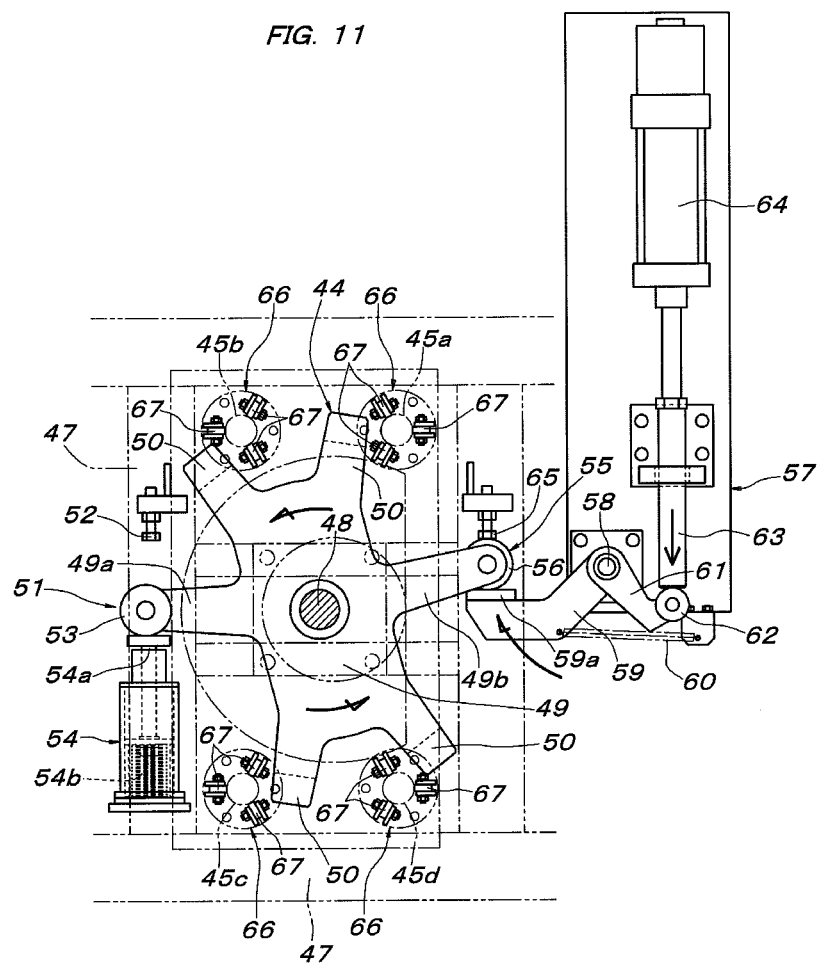
FIG. 11 is a partial cross sectional plan view showing an unlocked state of the locking means.
Figure 12:
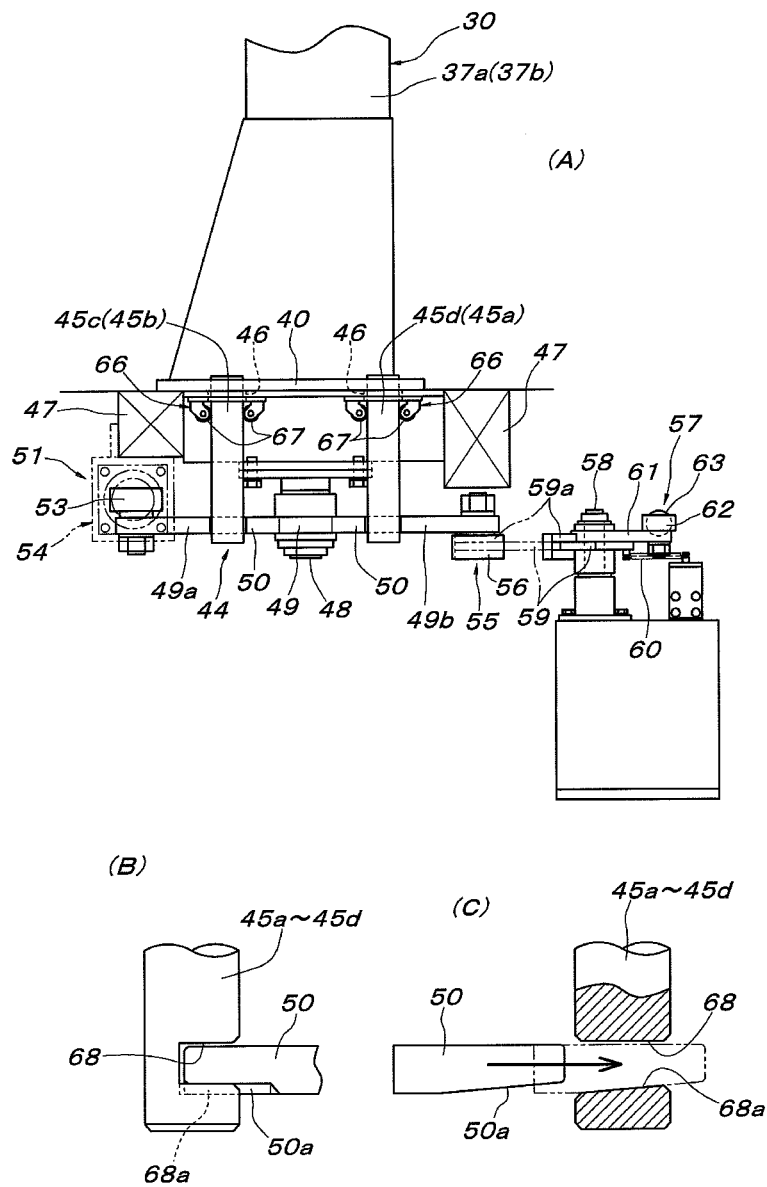
FIG. 12A is a front view of FIG. 10.
FIG. 12B is a lateral side view showing a locking pin and a locking piece.
FIG. 12C is a partial longitudinal sectional front view showing the locking pin and the locking piece.

The above-described strut bearing base 30 is unstable as compared to the table bearing bases 28 and 29, and thus, a locking means for locking the strut bearing base 30 in a state of being placed, i.e., a mounted state, on the conveyance carriage 1 is further provided. As shown in FIG. 10 to FIG. 12, the locking means 44 is installed for each strut member 37a, 37b and is provided with downwardly facing four position-determining and locking pins 45a to 45d that are provided in a projecting manner facing downward from four corners of the bases 40 at the lower end of the strut members 37a and 37b. At two locations of both left and right sides where the bases 40 are to be placed on the work floor 2 of the conveyance carriage 1, i.e., at two locations of both left and right sides of the elevating table 12, as shown in FIG. 4, four position-determining holes 46 are provided into which the locking pins 45a to 45d are each to be extractably inserted. On the lower side of a frame 47 (see FIG. 10 to FIG. 12) constituting the work floor 2 of the conveyance carriage 1 together with a floor plate, a movable plate 49 horizontally rotatable around a vertical support shaft 48 is provided at a substantially center position of a square region surrounded by four position-determining holes 46 when viewed in plan, and from a periphery of the movable plate 49, four locking pieces 50 are provided in a projecting manner corresponding to each position-determining hole 46. Moreover, an urging means 51 and a stopper 52 are provided for urging and holding each locking piece 50 (movable plate 49) in a locking posture in which a tip end of each locking piece 50 is positioned directly under the each position-determining hole 46. The urging means 51 is constituted by: a lever portion 49a provided in a projecting manner from the movable plate 49 facing laterally inward; a vertical axis roller 53 that is axially supported at a tip end of the lever portion 49a; and a spring cylinder 54 for pressing the vertical axis roller 53. As a result of a pusher (piston rod) 54a of the spring cylinder 54 being pushed out by an internally installed coil spring 54b, the pusher 54a rotates each locking piece 50 in one direction around the vertical support shaft 48 via the vertical axis roller 53, lever portion 49a, and movable plate 49, and the pusher 54a sandwiches the vertical axis roller 53 with the stopper 52, so that each locking piece 50 is held in a locking posture shown in FIG. 10.

Moreover, the above-described locking means 44 is provided with an unlocking operation portion 55 that interlocks with each locking piece 50. The unlocking operation portion 55 is constituted by a lever portion 49b that is provided in a projecting manner facing laterally outward from the movable plate 49 and a vertical axis roller 56 that is axially supported at a tip end of the lever portion 49b. On the other hand, in a work place for mounting and removing of the strut bearing base 30 that is set in the path of conveyance by the conveyance carriage 1, an unlocking operation means 57 shown in FIG. 10 to FIG. 12 is installed. The unlocking operation means 57 is for operating the unlocking operation portion 55 of the locking means 44 in the conveyance carriage 1 that is halted at a fixed position of the mounting and removing work place of the strut bearing base 30, and is constituted by: a lever-shaped movable piece 59 that is axially supported by a vertical support shaft 58 so as to freely swing horizontally and is provided at a tip end thereof with a pushing portion 59a for pushing the vertical axis roller 56 of the unlocking operation portion 55; a spring 60 for urging and holding the lever-shaped movable piece 59 at a waiting position shown in FIG. 10; an operated lever 61 that interlocks with the lever-shaped movable piece 59; a pusher rod 63 for pushing a vertical axis roller 62 that is axially supported at a tip end of the operated lever 61; and an actuator (cylinder unit) 64 for push-and-pull driving the pusher rod 63.

In a state that the conveyance carriage 1 is halted at a fixed position of the mounting and removing work place of the strut bearing base 30, by advancing the pusher rod 63 by the actuator 64 and pushing the operated lever 61 via the vertical axis roller 62 at the tip end of the pusher rod 63 to rotate the lever-shaped movable piece 59 around the vertical support shaft 58 against an urging force of the spring 60, the tip end pushing portion 59a of the lever-shaped movable piece 59 pushes the lever portion 49b (vertical axis roller 56) of the unlocking operation portion 55 that is provided in the locking means 44 on the conveyance carriage 1 side to rotate the movable plate 49 in a direction against the urging force of the urging means 51. As a result, each locking piece 50 that has been in the locking posture shown in FIG. 10 is switched to an unlocking posture shown in FIG. 11. At this time, a stopper 65 for receiving the vertical axis roller 56 of the lever portion 49b of the unlocking operation portion 55 is further provided, and the tip end pushing portion 59a of the lever shaped movable piece 59 sandwiches the vertical axis roller 56 with the stopper 65, so that each locking piece 50 is held in the unlocking posture.

For each position-determining hole 46 provided on the work floor 2 of the conveyance carriage 1, an elevation-guiding roller unit 66 of the locking pins 45a to 45d is further provided on the lower side of the work floor 2, so that the amount of displacement due to a difference between an inner diameter of the position-determining hole 46 and an outer diameter of each of the locking pins 45a to 45d is narrowed down to a permissible range and that an extracting and inserting movement of the locking pins 45a to 45d is carried out smoothly. Each elevation-guiding roller unit 66 is constituted by three circumferential horizontal axis rollers 67 proximal to three locations of each of the locking pins 45a to 45d inserted in the position-determining hole 46. Although not illustrated, also in the position-determining holes 36 of the table bearing bases 28 and 29 to be provided in the table main body 13 of the elevating table 12, the elevation-guiding roller units 66 of the above-described constitution may be further provided. Furthermore, although not illustrated, in each of the position-determining holes 36 and 46, a cover plate, for blocking these position-determining holes 36 and 46 from underneath as a result of upward movement by a spring, is axially supported to prevent foreign objects from falling into the position-determining holes 36 and 46 into which the position-determining pins 35 or the locking pins 45a to 45d are not inserted. The cover plate automatically moves to open in a lateral side direction by being pushed aside by the position-determining pins 35 or the locking pins 45a to 45d that are inserted into the position-determining holes 36 and 46.

In each of the locking pins 45a to 45d of the above-described locking means 44, as shown in FIGS. 12B and C, formed is an engaging groove 68 into which a tip end portion of the locking piece 50 enters in a horizontal lateral direction. The locking piece 50 in the locking posture shown in FIG. 10 prevents each of the locking pins 45a to 45d from dropping out therefrom by fitting the tip end portion thereof into the engaging groove 68 of each of the locking pins 45a to 45d and prevents the base 40 of the strut bearing base 30 provided with each of the locking pins 45a to 45d from inadvertently being lifted from the work floor 2 of the conveyance carriage 1 or the strut members 37a and 37b of the strut bearing base 30 from falling as a result of the locking pins 45a to 45d dropping out of the position-determining holes 46. In order not to have any play in a vertical direction of the base 40 or to minimize the same as much as possible, as shown in the drawings, it is possible to tilt a lower side surface 68a of the engaging groove 68 of the locking pins 45a to 45d so that a tip end portion of the locking piece 50 becomes higher toward a back in an entering direction and, if necessary, to tilt also a lower side surface 50a of the tip end portion of the locking piece 50 in the same direction as that of a lower side surface 68a of the engaging groove 68 so that, when the tip end portion of each locking piece 50 fits into the engaging groove 68 of the locking pins 45a to 45d in the horizontal direction, each locking piece 50 presses the locking pins 45a to 45d in a downward pulling direction via a relatively sliding and contacting movement of the lower side surface 50a of the tip end portion of each locking piece 50 and the lower side surface 68a of the engaging groove 68 of the locking pins 45a to 45d.

Figure 2:
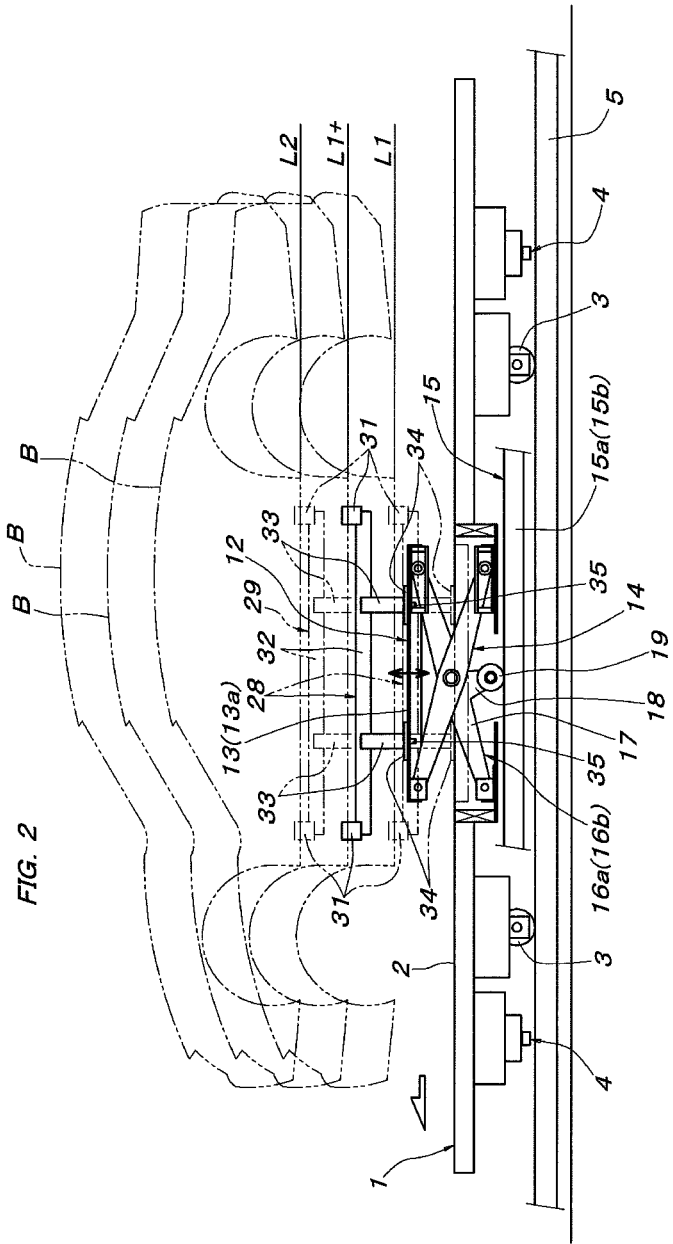
FIG. 2 is a partial longitudinal sectional side view of a state in which a table bearing base is mounted on the conveyance carriage.

In the conveyance carriage 1 constituted as above, as shown in FIG. 1 to FIG. 3, in a state in which the table main body 13 of the elevating table 12 is at the lowering limit position (in a state in which the table surface 13a is flush with the work floor 2 of the conveyance carriage 1), when the low supporting table bearing base 28 is mounted on the table main body 13 of the elevating table 12 by inserting each position-determining pin 35 of the bearing base 28 into the position-determining hole 36 (see FIG. 7) on the table main body 13 side, an object to be conveyed, which is supported on the low supporting table bearing base 28 by using the bearing portion 31, i.e., the vehicle body B, will be supported at a lowest support level L1 equivalent to the height of the low supporting table bearing base 28, i.e., the lowest support level L1 of the height with respect to the work floor 2 of the conveyance carriage 1. Furthermore, in a state in which the table main body 13 of the elevating table 12 is at the lowering limit position, when the high supporting table bearing base 29 is mounted on the table main body 13 of the elevating table 12 by employing the same method as that for the low supporting table bearing base 28, the vehicle body B to be supported on the high supporting table bearing base 29 by using the bearing portion 31 will be supported at a high support level L2 equivalent to the height of the high supporting table bearing base 29.

In a state in which the low supporting table bearing base 28 is mounted on the table main body 13 of the elevating table 12 as described above, as shown in FIG. 2, when the table main body 13 is elevated to the rising limit position by the crosslink mechanism 14 and the cam 15 on the conveyance path side, i.e., when the conveyance carriage 1 travels on the conveyance path where the cam 15 has been laid, the vehicle body B to be supported by the low supporting table bearing base 28 will be supported at an intermediate support level L1+, which is higher than the lowest support level L1 but lower than the high support level L2 that is a support level when the high supporting table bearing base 29 is used. As a matter of course, in a state in which the high supporting table bearing base 29 is mounted on the table main body 13 of the elevating table 12, as shown in FIG. 2, when the table main body 13 is elevated to the rising limit position by the crosslink mechanism 14 and the cam 15 on the conveyance path side, i.e., when the conveyance carriage 1 travels on the conveyance path where the cam 15 has been laid, it is possible to further increase the height of the support level of the vehicle body B supported by the high supporting table bearing base 29 by an elevated height of the table main body 13 than the high support level L2.

When the vehicle body B to be supported on the table main body 13 of the elevating table 12 by using one of the low supporting table bearing base 28 and the high supporting table bearing base 29 is conveyed by the conveyance carriage 1, the strut bearing base 30 is as a matter of course not mounted, so only the flat work floor 2 of the conveyance carriage 1 is present in a surrounding area of the supported vehicle body B, and thus, work for the lateral side of the vehicle body B can safely and easily be conducted on the work floor 2 surrounding the vehicle body B.

Moreover, as shown in FIG. 1, FIG. 5, and FIG. 6, when the strut bearing base 30 is used, one of the low supporting table bearing base 28 and the high supporting table bearing base 29 that has been mounted on the table main body 13 of the elevating table 12 is removed, and the table main body 13 is descended to the lowering limit position, and in a state in which the entire work floor 2 of the conveyance carriage 1 is made flat, the strut bearing base 30 is mounted at both left and right sides of the elevating table 12. A replacement work of the bearing base from one of the low supporting table bearing base 28 and the high supporting table bearing base 29 to the strut bearing base 30 is carried out in a state in which the conveyance carriage 1 is halted at a fixed stop position in the conveyance path where the cam 15 has not been laid, but as previously described, in the bearing base replacement workplace, the unlocking operation means 57 shown in FIG. 10 has been installed.

Thus, when the conveyance carriage 1 is halted at the fixed position in the bearing base replacement work place, the unlocking operation means 57 is in a positional relationship shown in FIG. 10 with respect to the unlocking operation portion 55 of the locking means 44 installed at both left and right sides in a bottom portion of the conveyance carriage 1, and therefore, by activating the actuator 64 of the unlocking operation means 57 after the conveyance carriage 1 is halted and, as shown in FIG. 11, the pusher rod 63 that makes an advancing movement is caused to rotate the lever-shaped-movable piece 59 around the vertical support shaft 58 against the urging force of the spring 60 via the vertical axis roller 62 and the operated lever 61, and the pushing portion 59a at the tip end thereof is caused to push the vertical axis roller 56, which is the unlocking operation portion 55 on the locking means 44 side, up to a position to sandwich the same with the stopper 65. As a result, the movable plate 49 rotates around the vertical support shaft 48 by only a predetermined angle against the urging force of the urging means 51 (spring cylinder 54) via the lever portion 49b, thereby switching the state to one in which each locking piece 50 surrounding the movable plate 49 is offset in a lateral side direction from a position directly under the position-determining hole 46 into which each of the locking pins 45a to 45d on the strut bearing base 30 side is to be inserted.

Therefore, when the strut bearing base 30 is hung down at a predetermined position on the conveyance carriage 1, the locking means 44 for locking the strut bearing base 30 on the conveyance carriage 1 side is in the unlocked state, and thus, each of the locking pins 45a to 45d on the strut bearing base 30 side can be inserted into each position-determining hole 46 on the conveyance carriage 1 side (see FIG. 4) without any trouble. Once the pair of left and right strut members 37a and 37b of the strut bearing base 30 are transferred, to the predetermined position on the work floor 2 of the conveyance carriage 1, into a state where each of the locking pins 45a to 45d is inserted into each position-determining hole 46 and each base 40 rests on the work floor 2, the pusher rod 63 of the unlocking operation means 57 is moved and retracted to, as shown in FIG. 10, return the lever-shaped movable piece 59 into the original retreated posture by the urging force of the spring 60, whereby the movable plate 49 of the locking means 44 returns, due to the urging force of the urging means 51, into the original posture, i.e., the locking posture in which the vertical axis roller 53 at the tip end of the lever portion 49a is fixed by having been sandwiched by the pusher (piston rod) 54a of the urging means 51 and the stopper 52. As a result, the state is switched to one in which the tip end portion of each locking piece 50 is engaged with the engaging groove 68 of each of the locking pins 45a to 45d (see FIGS. 12B and 12C) to make it impossible to pull out each of the locking pins 45a to 45d, and the strut bearing base 3 is locked with respect to the conveyance carriage 1, thereby being reliably prevented from inappropriate swinging or falling. Furthermore, the lever-shaped movable piece 59 of the unlocking operation means 57 does not interfere with the unlocking operation portion 55 of the locking means 44 on the conveyance carriage 1 side when travel of the conveyance carriage 1 begins.

When the strut bearing base 30 mounted on the conveyance carriage 1 as described above is caused to support the vehicle body B, the vehicle body B will be supported at a height that allows a worker to enter from a lower side of the vehicle body B, i.e., at a highest level L3 favorable for a work on the bottom portion of the vehicle body B. Furthermore, because the cam 15 has not been laid on the conveyance path of the vehicle body B supported by the strut bearing base 30, the table main body 13 of the elevating table 12 positioned underneath the vehicle body B supported by the strut bearing base 30 is at the lowering limit position, and the table surface 13a of the table main body 13 is flush with the work floor 2 of the conveyance carriage 1. Moreover, because the pair of left and right strut members 37a and 37b of the strut bearing base 30 are positioned on both left and right outer sides of the supporting vehicle body B, work requiring entrance from the lower side of the vehicle body B supported at the highest level L3 can be carried out safely and easily.

Again, when replacing the strut bearing base 30 with one of the low supporting table bearing base 28 and the high supporting table bearing base 29, the replacement work of the bearing base is carried out in a state in which the conveyance carriage 1 is halted at a fixed position of the bearing base replacement work place, and in the bearing base replacement work place, as previously described, the unlocking operation means 57 shown in FIG. 10 has been installed. Thus, when the conveyance carriage 1 is halted at a fixed position, the unlocking operation means 57 is in the positional relationship shown in FIG. 10 with respect to the unlocking operation portion 55 of the locking means 44 installed at both left and right sides in the bottom portion of the conveyance carriage 1, and thus, by activating the actuator 64 of the unlocking operation means 57 after the conveyance carriage 1 is halted to conduct the same unlocking operation as the previously described unlocking operation, as shown in FIG. 11, each locking piece 50 is caused to separate and move in the lateral side direction from each of the locking pins 45a to 45d on the strut bearing base 3 side, thereby switching the state to one in which it is possible to unlock the lock of the strut bearing base 30 and suspend the strut bearing base 30 upward.

After removing the strut bearing base 30, once one of the low supporting table bearing base 28 and the high supporting table bearing base 29 is mounted on the table main body 13 of the elevating table 12 positioned at the lowering limit position, the conveyance carriage 1 is caused to travel in a state in which the vehicle body B is being supported by one of the low supporting table bearing base 28 and the high supporting table bearing base 29. However, prior to this travel, the pusher rod 63 of the unlocking operation means 57 is retracted and moved to, as shown in FIG. 10, return each locking piece 50 of the locking means 44 to the original locking position. Thereby, the lever-shaped movable piece 59 of the unlocking operation means 57 does not interfere with the unlocking operation portion 55 of the locking means 44 on the conveyance carriage 1 side at the time when the conveyance carriage 1 begins to travel.

In addition, when one of the low supporting table bearing base 28 and the high supporting table bearing base 29 is mounted on the table main body 13 of the elevating table 12 and the vehicle body B is conveyed while being supported either by the low supporting table bearing base 28 or the high supporting table bearing base 29, in accordance with a work content with respect to the vehicle body B on the conveyance path, the height of the table main body 13 may be alternatively selected from the lowering limit position and the rising limit position as previously described, but in some cases, it is also possible to constitute the table main body 13 so as to be switched to an arbitrary support level between the lowering limit position and the rising limit position for each section by changing the height of the cam 30 for each section, and so on.

What is claimed is:

1. A conveyance device comprising:
    a conveyance carriage traveling along a conveyance path;
    an elevating table provided in the conveyance carriage, the elevating table having a table main body and a table bearing base removably mountable on the table main body for supporting a lowerside of an object to be conveyed,
    the table main body having a top surface, and the top surface being flush with a flat work floor on the conveyance carriage when the table main body is in a lowering limit position;
    a strut bearing base mountable on the conveyance carriage, the strut bearing base having a pair of left and right strut members removably mountable on the conveyance carriage at left and right sides of the elevating table, respectively;
    the left and right strut members each comprising a bearing portion for supporting one of left and right edges of the object to be conveyed, a base supported by the flat work floor on the conveyance carriage, and at least one locking pin protruding vertically downward from the base,
    at least one position-determining hole disposed in the flat work floor supporting the base of each strut member, and the locking pin of each strut member being extractably insertable into an associated position-determining hole;
    locking means for freely lockingly engaging with each locking pin inserted into the associated position-determining hole under a lowerside of the flat work floor of the conveyance carriage;
    the flat work floor on the conveyance carriage having only the position-determining holes around the object to be conveyed, when the object to be conveyed is supported by the elevating table and the strut bearing base is removed; and
    when the elevating table is in the lowering limit position with the table bearing base removed and the object to be conveyed is supported by the strut bearing base mounted on the conveyance carriage, the conveyance carriage provides a flat work floor on the conveyance carriage, including the top surface of the table main body, and a space for workers to enter into to work on a lowerside of the object.

2. The conveyance device according to claim 1, further comprising an operating means for operating an unlocking operation portion provided in the locking means in an unlocking direction, and the operating means being disposed at a location in the conveyance path at which the strut bearing base is mounted and removed from the conveyance carriage.

3. The conveyance device according to claim 2, further comprising:
    for each locking pin, the locking means having a locking piece freely engageable with a locking portion of the locking pin and having an urging means for urging the locking piece in an engaging direction, and the locking piece being operable to freely swing horizontally when urged in the engaging direction by the urging means;
    for each locking pin, the unlocking operation portion having a lever portion operable to interlock with the locking piece; and the operating means having a movable piece with a pushing portion operable to push the lever portion with the conveyance carriage halted at a fixed position, and an actuator for driving the movable piece.

4. The conveyance device according to claim 3, further comprising:
    each strut member having a plurality of locking pins protruding downwardly from the base;
    for each strut member, the locking means having a movable plate horizontally rotatable around a vertical support shaft, the movable plate being provided in the conveyance carriage within a region surrounded by the plurality of locking pins;
    for each strut member, the locking means further having a plurality of locking pieces protruding from an area surrounding the movable plate, each of the locking pieces being associated with a respective locking pin; and
    the urging means and the unlocking operation portion are provided for each movable plate.

5. The conveyance device according to claim 1, further comprising:
    the conveyance carriage being operable to convey an object supported by the strut bearing base; and
    the conveyance carriage being operable to convey an object supported by the elevating table.

* * * * *